US007018095B2

(12) United States Patent  
Grannes et al.

(10) Patent No.: US 7,018,095 B2
(45) Date of Patent: Mar. 28, 2006

(54) CIRCUIT FOR SENSING ON-DIE TEMPERATURE AT MULTIPLE LOCATIONS

(75) Inventors: Dean J. Grannes, Fremont, CA (US); Harjinder Singh, San Jose, CA (US); Jason A. Gayman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/184,534

(22) Filed: Jun. 27, 2002

(65) Prior Publication Data

US 2004/0001527 A1     Jan. 1, 2004

(51) Int. Cl.
  *G01K 13/00*  (2006.01)
  *G06F 1/32*   (2006.01)
(52) U.S. Cl. .................. 374/166; 374/178; 374/137; 327/505
(58) Field of Classification Search ......... 374/166, 374/178, 137, 170, 172, 141, 163; 327/505, 327/504, 493, 512, 513; 257/467–470; 361/103; 365/211, 212; 324/760, 765, 767
See application file for complete search history.

(56) References Cited

U.S. PATENT DOCUMENTS

| 3,330,158 | A | * | 7/1967 | Simonyan et al. | 257/470 |
|---|---|---|---|---|---|
| 3,440,883 | A | * | 4/1969 | Lightner | 374/178 |
| 4,050,083 | A | * | 9/1977 | Jaskolski et al. | 327/512 |
| 4,994,688 | A | * | 2/1991 | Horiguchi et al. | 327/513 |
| 5,100,829 | A | * | 3/1992 | Fay et al. | 374/178 |
| 5,154,514 | A | * | 10/1992 | Gambino et al. | 374/178 |
| 5,440,520 | A | * | 8/1995 | Schutz et al. | 365/211 |
| 5,500,547 | A | * | 3/1996 | Yamaguchi et al. | 257/470 |
| 5,639,163 | A | * | 6/1997 | Davidson et al. | 374/178 |
| 5,751,159 | A | * | 5/1998 | Holm et al. | 327/767 |
| 5,949,121 | A | * | 9/1999 | Qualich et al. | 257/470 |
| 5,961,215 | A | * | 10/1999 | Lee et al. | 374/178 |
| 5,990,576 | A | * | 11/1999 | Sakai et al. | 327/493 |
| 6,084,458 | A | * | 7/2000 | Fu | 327/505 |
| 6,321,175 | B1 | * | 11/2001 | Nagaraj | 257/467 |
| 6,332,710 | B1 | * | 12/2001 | Aslan et al. | 327/512 |
| 6,580,150 | B1 | * | 6/2003 | Metzler | 257/594 |
| 6,612,738 | B1 | * | 9/2003 | Beer et al. | 374/178 |
| 6,674,623 | B1 | * | 1/2004 | Abe et al. | 361/103 |

FOREIGN PATENT DOCUMENTS

DE          19652046 A1 *  6/1998

OTHER PUBLICATIONS

Draxelmayr, D., Derwent-Acc-No. 1998-334224, Abstracted-Pub-No: DE 1965204A, published 2003 (no month).*

(Continued)

*Primary Examiner*—Diego Gutierrez
*Assistant Examiner*—Stanley J. Pruchnic, Jr.
(74) *Attorney, Agent, or Firm*—David P. McAbee

(57) ABSTRACT

A circuit for sensing on-die temperature at multiple locations using a minimum number of pins is described. Thermal diodes coupled to pins are placed on a die to measure the temperature at various die locations. Voltage is applied to the pins to determine the temperature at each given diode location. The polarity of the voltage applied across the pins determines what diodes are selected for measurement.

11 Claims, 3 Drawing Sheets

OTHER PUBLICATIONS

"On Chip Temperature Sensor," IBM Technical Disclosure Bulletin vol. 36, No. 8, TDB-Acc-No: NN9308489, pp. 489-492, (Aug. 1, 1993).*

ANSI/IEEE Std 100-1977, IEEE Standard Dictionary of Electrical and Electronic Terms, 2nd Edition, (Frank Jay, Editor in Chief), 1978, pp. 344, 439, 710 and 711.*

* cited by examiner

CIRCUIT FOR SENSING ON-DIE TEMPERATURE AT MULTIPLE LOCATIONS

FIELD OF THE INVENTION

The present invention pertains to the field of integrated circuit design. More particularly, the present invention relates to a circuit for sensing temperature at multiple locations on a silicon die using a minimum number of integrated circuit terminals.

BACKGROUND OF THE INVENTION

An integrated circuit (IC) is a device consisting of a number of connected circuit elements, such as transistors and resistors, fabricated on a single chip of silicon crystal or other semiconductor material. During operation, an IC burns power causing the temperature of the IC to increase. An overheated IC can potentially result in reduced performance and even failure.

ICs, however, are typically packaged in such a way that it is difficult to directly measure the temperature at the active part of the die using a thermocouple or other external measuring device. As a result, the standard method for measuring the die temperature of an IC is to incorporate a thermal diode with known thermal characteristics into the design of the IC.

Thermal diodes are typically the base-emitter junction of a substrate connected PNP transistor. This junction may be modeled using the ideal diode equation. The equation of an ideal diode is:

$$i = I_s \left( e^{\frac{vq}{nkT}} - 1 \right) \quad \text{(equation 1)}$$

where i is the forward biased current through the diode, $I_s$ is the saturation current of the diode, v is the voltage drop across the diode, q is the charge of an electron, n is an ideality factor, k is Boltzmann's Constant, and T is the temperature in Kelvin. The ideality factor n is constant for a given process technology. A range for this number is typically available in its product data sheet.

To measure the die temperature using a diode, the terminals of the diode are coupled to IC terminals. By applying a current i to the diode, the voltage drop v across the diode is measured at the terminals. For this measurement, the IC may or may not be running. By measuring the voltage drop at two different currents, $i_1$ and $i_2$, at constant temperature T, the value $I_s$ is cancelled out as shown in the equation:

$$\frac{i_1}{i_2} = \frac{I_s\left(e^{\frac{v_1 q}{knT}} - 1\right)}{I_s\left(e^{\frac{v_2 q}{knT}} - 1\right)} = \frac{e^{\frac{v_1 q}{knT}} - 1}{e^{\frac{v_2 q}{knT}} - 1}. \quad \text{(equation 2)}$$

Equation 2 may be simplified by removing the 1's since they are negligible. Thus, the equation becomes:

$$\frac{i_1}{i_2} = \frac{e^{\frac{v_1 q}{knT}}}{e^{\frac{v_2 q}{knT}}}. \quad \text{(equation 3)}$$

Given that the ratio of the currents is constant, the temperature is directly proportional to the difference in the two measured voltage drops, $v_1$ and $v_2$:

$$\ln\left(\frac{i_1}{i_2}\right) = \ln\left(\frac{e^{\frac{v_1 q}{knT}}}{e^{\frac{v_2 q}{knT}}}\right) = \ln\left(e^{\frac{v_1 q}{knT}}\right) - \ln\left(e^{\frac{v_2 q}{knT}}\right) = \frac{v_1 q}{knT} - \frac{v_2 q}{knT}$$

Solving for T:

$$T = \left(\frac{q}{kn\ln\left(\frac{i_1}{i_2}\right)}\right)(v_1 - v_2). \quad \text{(equation 4)}$$

Equation 4, however, does not include the effective series resistance, $R_s$, of the diode. Typically, long traces are a primary source of effective series resistance. Placing the diode near IC terminals would help to reduce series resistance. In reality, however, the diode is often a distance from the IC terminals due to area constraints. Because the effective series resistance may be substantial in an IC such as a microprocessor, it would be desirable to include its effects in the temperature calculation.

In addition, as the trend in IC design continues toward smaller chips, the power density increases and becomes less uniform. This causes the thermal gradients across the die to become greater. As a result, even though previous ICs were able to suffice with a single thermal diode at a single location on the die, future ICs may require multiple thermal diodes in order to map out the thermal profile in better detail.

Because IC terminals are at a premium on chips, the addition of thermal diodes beyond the first one may be cost prohibitive. Therefore, it would be desirable for a circuit to allow for the placement of multiple thermal diodes on the die while minimizing the number of IC terminals used.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The use of multiple thermal diodes allow for the determination of thermal gradients on an IC. Multiple diodes may be used to measure die temperature without having to use two times the number of IC terminals per diode by taking advantage of the diodes' electrical properties. A diode has an anode terminal and a cathode terminal. Current flows primarily from the anode terminal of the diode to the cathode terminal.

Therefore, if two diodes having opposite polarity (terminals are flipped with respect to one another) are placed between two parallel conducting wires of differing voltages, current will only flow through the diode having its anode terminal connected to the wire having the higher voltage and its cathode terminal connected to the wire having the lower voltage. The other diode will not conduct because it will be reverse biased. Because the leakage current of the reverse biased diode is substantially smaller than the current passing through the forward biased diode, the leakage current is negligible.

Figure 1:
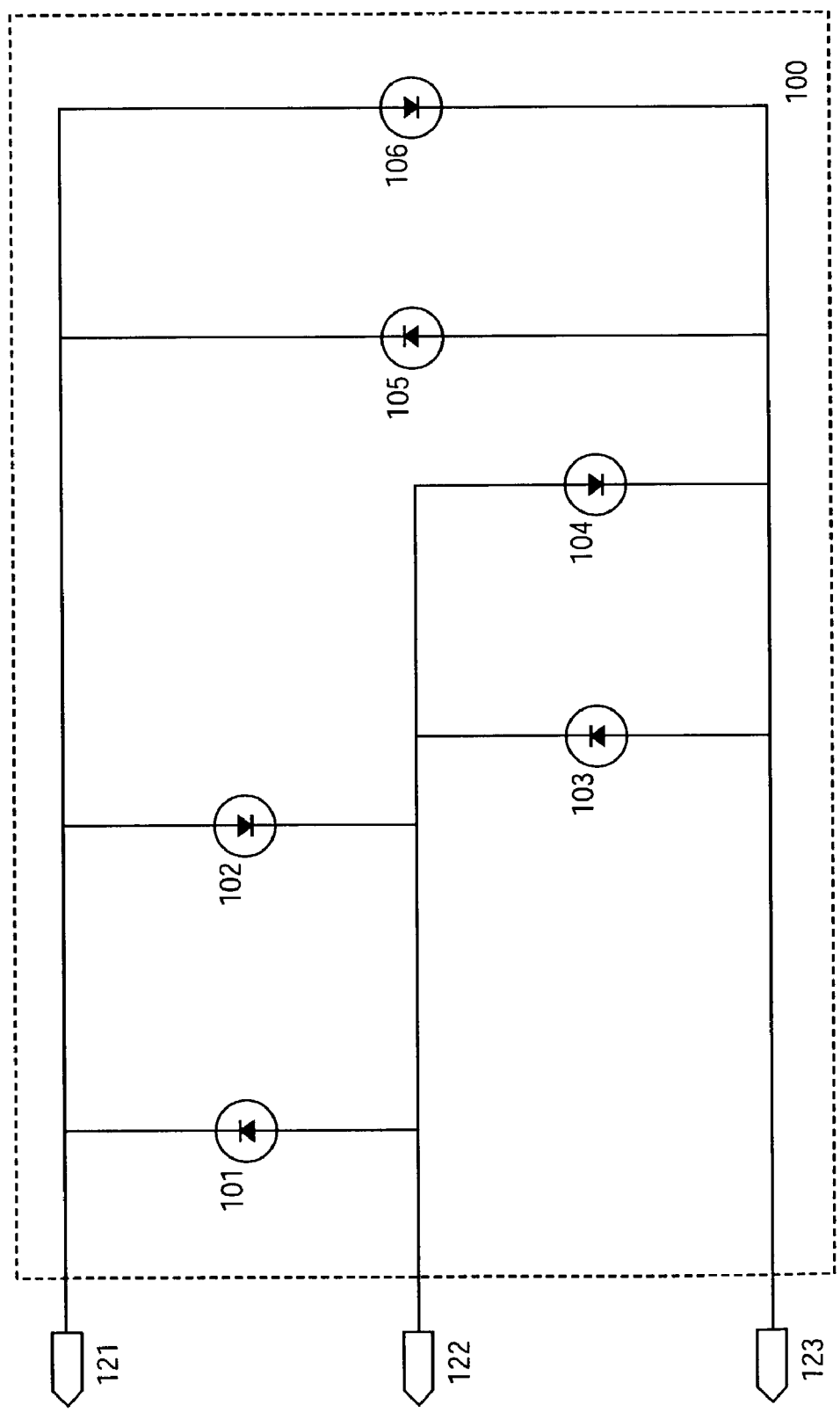
FIG. 1 is one embodiment of a circuit for sensing on die temperature at multiple locations.

Taking advantage of this theory, FIG. 1 depicts one embodiment of the invention. The circuit of FIG. 1 has six diodes (101–106) and three IC terminals (121–123). Depending on the packaging used, the IC terminals 121–123 may be implemented as bumps or pins. Diodes 101 and 102 are coupled to IC terminals 121 and 122. Diodes 103 and 104 are coupled to IC terminals 122 and 123. Diodes 105 and 106 are coupled to IC terminals 121 and 123.

Each of the diodes 101–106 has an anode terminal, a cathode terminal, and a clamping voltage of approximately 0.7 volts (V). When two voltages are applied to a diode such that the cathode terminal is coupled to a higher voltage than the anode terminal, a forward biased current is generated across that diode.

As an example, if 0.7 V is applied to IC terminal 121, 0 V is applied to IC terminal 123, and IC terminal 122 is left in a high impedance state such that no current flows into or out of IC terminal 122, a forward biased current will flow through diode 106. Because diode 105 has the opposite polarity as diode 106, diode 105 is reverse biased. Thus, no current will flow across diode 105.

Figure 3:
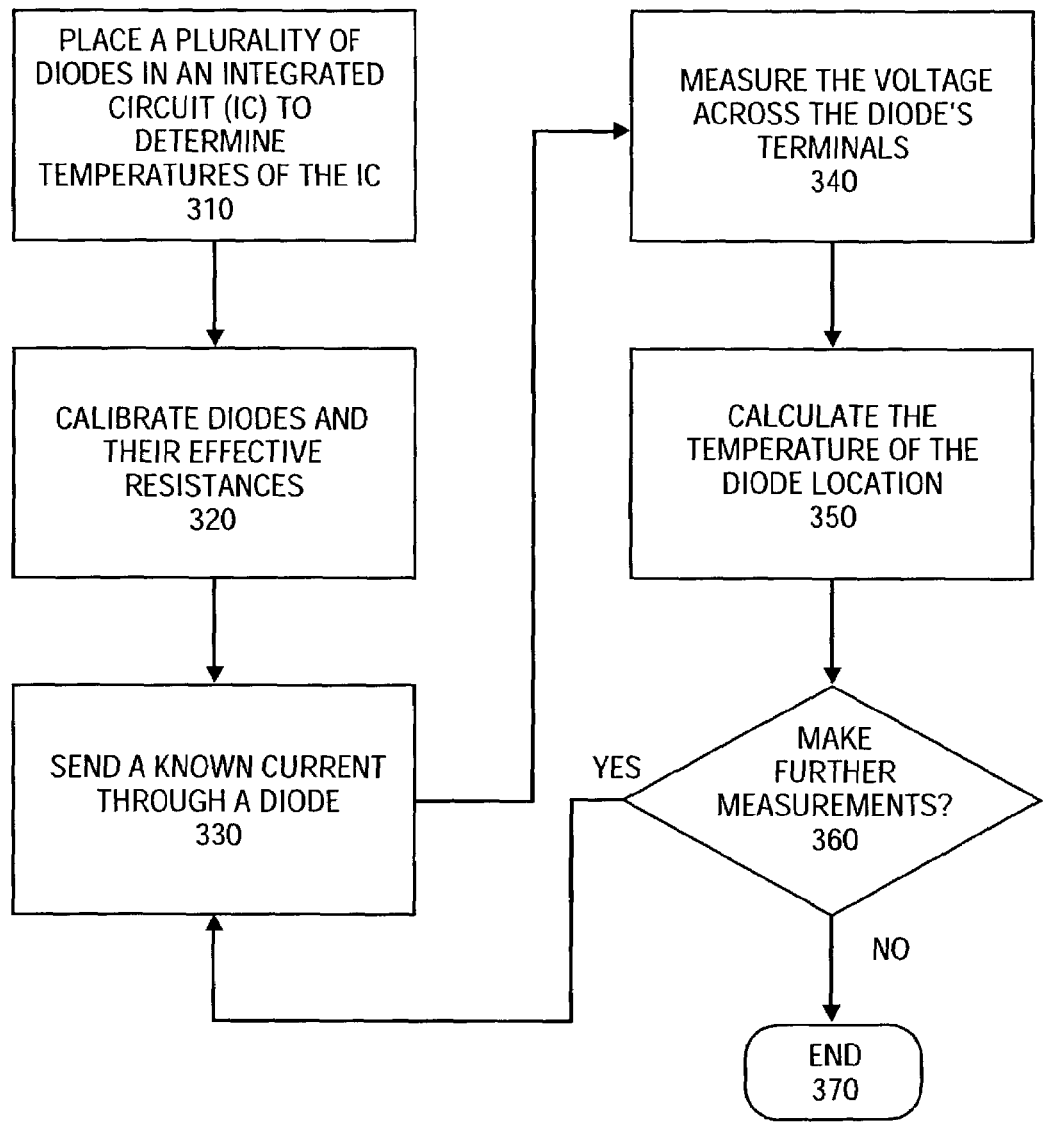
FIG. 3 is a flowchart for calculating the temperature at a die location.

Note that diodes 102 and 104 will also be forward biased. However, because only 0.7 volts is applied across IC terminals 121 and 123, the forward biased current traveling through diodes 102 and 104 are orders of magnitude less than the current traveling through diode 106. As a result, the current measured across the IC terminals 121 and 123 will predominately reflect the forward biased current traveling through diode 106. From the current measurement, the temperature at diode 106 may be calculated. The temperature calculation process is depicted in FIG. 3 and described below.

From FIG. 1 and the example above, it can be seen that a pair of diodes having opposite polarity may be placed between each set of IC terminals. Specifically, the number of diodes that may be used on an IC may be defined by the equation:

$$D = N*(N-1) \quad \text{(equation 5)}$$

where D is the number of diodes and N is the number of IC terminals.

Figure 2:
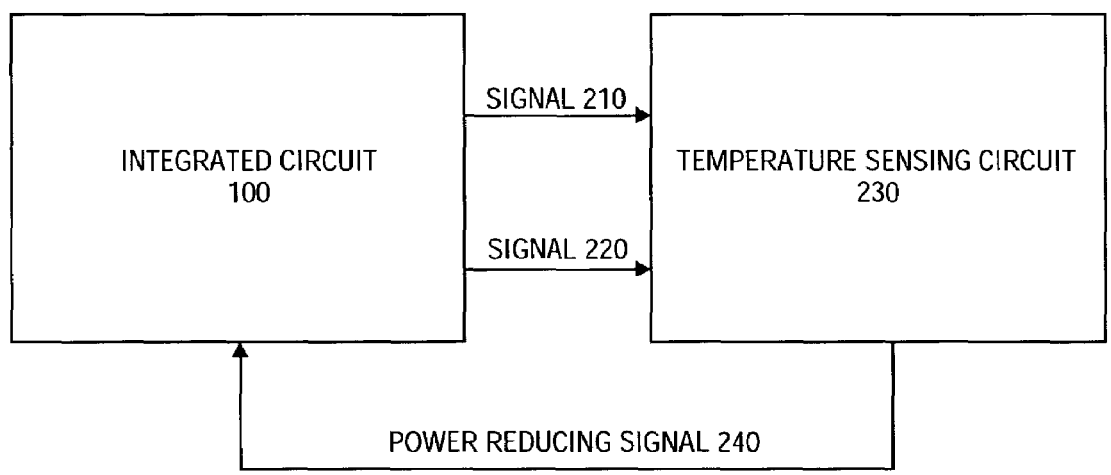
FIG. 2 is one embodiment of a system that measures die temperatures.

FIG. 2 depicts one embodiment of a system that uses thermal diodes to prevent an IC from overheating. For this embodiment of the invention, IC 100 has a plurality of diodes distributed throughout the chip to measure temperatures. Signals 210 and 220 are diode measurements obtained from IC 100. A temperature sensing circuit 230 is coupled to integrated circuit 100 and calculates temperatures based upon signals 210 and 220. If the calculated temperature is greater than a predetermined threshold value, the temperature sensing circuit 230 reduces the power of integrated circuit 100.

For another embodiment of the invention, the temperature sensing circuit 230 is manufactured on the same die as integrated circuit 100.

A process for calculating IC temperatures is depicted in FIG. 3. In operation 310, a plurality of diodes is placed on an IC to determine temperatures of the IC. The number of diodes on the IC may be approximately equal to n*(n−1), where n is the number of IC terminals.

In operation 320, the diodes are calibrated to determine their electrical characteristics across a range of possible operating temperatures. The calibration helps to determine voltage or current values that may be safely applied to a thermal diode. Calibration may be accomplished by soaking the die in a chemical bath at different temperatures. Moreover, the effective series resistance of the diode is also calibrated. As stated above, the effective series resistance of diodes may be caused by long traces. For one embodiment of the invention, the traces are copper wires. For another embodiment of the invention, the traces are aluminum wires.

The resistance of copper and aluminum wires vary with temperature. Thus, the relationship of the trace resistivity and its corresponding temperature may be defined by a curve. This curve may have a known series resistance value $R_{s0}$ at a temperature $T_0$, a known series resistance value $\rho_0$ at 0 Kelvin, and a slope M. Series resistance $R_s$ may be represented by:

$$R_S = R_{S0}\left(1 + \frac{T - T_0}{T_0 + \frac{\rho_0}{m}}\right), \quad *\text{All temperatures are in Kelvin.} \quad \text{(equation 6)}$$

Following operation 320, a known current $i_1$ is sent through a diode on the IC in operation 330. The current is sent through the diode through an IC terminal and allowed to return via another IC terminal. As previously discussed, it is possible to have two diodes having opposite polarity coupled between any two IC terminals. Thus, the selected diode is determined by which IC terminal the current is sourced since current will not conduct across a reverse biased diode.

The voltage drop $v_1$ is then measured across the diode's terminals in operation 340. A second set of current and voltage values, $i_2$ and $v_2$, may then be obtained. To calculate the temperature of the diode in operation 350, the voltage drop across the diode may be represented by:

$$v = \left(\frac{nkT}{q}\right)\ln\left(\frac{i}{I_s}\right) + i \cdot R_S \quad \text{(equation 7)}$$

which includes the effective series resistance. Accordingly, the temperature equation of equation 4 may be rewritten as:

$$T = \left(\frac{q}{kn\ln\left(\frac{i_1}{i_2}\right)}\right)(v_1 - v_2 - R_S(i_1 - i_2)). \quad \text{(equation 8)}$$

Equation 8 assumes that the series resistance of the trace is approximately equal in temperature as the diode being measured. Equation 8 may be rewritten as:

$$T = \left(\frac{q}{kn\ln\left(\frac{i_1}{i_2}\right)}\right)(v_1 - v_2) - \left(\frac{qR_S}{kn\ln\left(\frac{i_1}{i_2}\right)}\right)(i_1 - i_2).$$ (equation 9)

From equation 6, $R_s$, may alternatively be represented by:

$$R_S = R_{S0}\left(1 + \frac{T_0}{T_0 + \frac{\rho_0}{m}}\right) + T\left(\frac{R_{S0}}{T_0 + \frac{\rho_0}{M}}\right).$$ (equation 10)

The equation 10 can be substituted into equation 9 such that $$T = \left(\frac{q}{kn\ln\left(\frac{i_1}{i_2}\right)}\right)(v_1 - v_2) -$$

$$\left(\frac{q}{kn\ln\left(\frac{i_1}{i_2}\right)}\right)(i_1 - i_2)\left(R_{S0}\left(1 - \frac{T_0}{T_0 + \frac{\rho_0}{M}}\right) + T\left(\frac{R_{S0}}{T_0 + \frac{\rho_0}{M}}\right)\right)$$

Resolve for T:

$$T = \left(\frac{q}{kn\ln\left(\frac{i_1}{i_2}\right)}\right)(v_1 - v_2) - \left(\frac{q}{kn\ln\left(\frac{i_1}{i_2}\right)}\right)(i_1 - i_2)(R_{S0})\left(1 - \frac{T_0}{T_0 + \frac{\rho_0}{M}}\right) - T\left(\frac{R_{S0}}{T_0 + \frac{\rho_0}{M}}\right)\left(\frac{q}{kn\ln\left(\frac{i_1}{i_2}\right)}\right)(i_1 - i_2)$$ (equation 11)

$$T\left(1 + \left(\frac{R_{S0}}{T_0 + \frac{\rho_0}{M}}\right)\left(\frac{q}{kn\ln\left(\frac{i_1}{i_2}\right)}\right)(i_1 - i_2)\right) = \left(\frac{q}{kn\ln\left(\frac{i_1}{i_2}\right)}\right)(v_1 - v_2) - \left(\frac{q}{kn\ln\left(\frac{i_1}{i_2}\right)}\right)(i_1 - i_2)(R_{S0})\left(1 - \frac{T_0}{T_0 + \frac{\rho_0}{M}}\right)$$

$$T = \frac{\left(\frac{q}{kn\ln\left(\frac{i_1}{i_2}\right)}\right)(v_1 - v_2) - \left(\frac{q}{kn\ln\left(\frac{i_1}{i_2}\right)}\right)(i_1 - i_2)(R_{S0})\left(1 - \frac{T_0}{T_0 + \frac{\rho_0}{M}}\right)}{1 + \left(\frac{R_{S0}}{T_0 + \frac{\rho_0}{M}}\right)\left(\frac{q}{kn\ln\left(\frac{i_1}{i_2}\right)}\right)(i_1 - i_2)}.$$

Alternatively, equation 11 can be expressed as:

$$T = \frac{(v_1 - v_2) - (i_1 - i_2)(R_{S0})\left(1 - \frac{T_0}{a}\right)}{\frac{1}{g} + \left(\frac{R_{S0}}{a}\right)(i_1 - i_2)}$$ (equation 12)

where $a = T_0 + \frac{\rho_0}{M}$, $g = \frac{q}{kn\ln\left(\frac{i_1}{i_2}\right)}$.

Equation 12 compensates for effective series resistance and effective series resistance changes due to thermal variation. Note that the values $v_1$ and $v_2$ were obtained based on $i_1$ and $i_2$ inputs. The values for $R_0$, $T_0$, $\rho_0$, and M were obtained during the series resistance calibration of operation 320. By substituting these values into equation 12, the temperature T of the diode may be calculated.

After the temperature calculation, operation 360 determines whether there are further temperature measurement requests. If there are further measurement requests, a first known current and a second known current are sent through another diode in operation 330, the voltage is measured across the diode's terminals in operation 340, and the temperature is calculated in operation 350. Otherwise, the process is terminated in operation 370.

For another embodiment of the invention, only one known current is sent through a diode. The voltage is then measured and translated into a temperature by applying a linear approximation. The equation of the linear approximation may be determined by characterizing many parts to determine the average voltage response to temperature at a given current.

For yet another embodiment of the invention, instead of sending a known current through a diode and measuring the voltage across the diode's terminals as in operations 330 and 340 of FIG. 3, a known voltage source is placed across a diode's terminals in operation 330 and the corresponding current is measured in operation 340. The remaining operations of FIG. 3 remain the same.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. An apparatus comprising: an integrated circuit (IC) having
   a first, second, and third IC terminal;
   a first diode to measure a first temperature at a first location on the IC, wherein an anode terminal of the first diode is coupled to the first IC terminal and a cathode terminal of the first diode is coupled to the second IC terminal;
   a second diode to measure a second temperature at a second location on the IC, which is spaced apart from the first location, wherein the second diode is coupled between the first and second IC terminals in an opposite polarity of the first diode;
   a third diode to measure a third temperature at a third location on the IC, which is spaced apart from the first and second locations, wherein the anode terminal of the third diode is coupled to the second IC terminal and a cathode terminal of the third diode is coupled to the third IC terminal; and
   a fourth diode to measure a fourth temperature at a fourth location on the IC, which is spaced apart from the first, second, and third locations, wherein the fourth diode is coupled between the second and third IC terminals in the opposite polarity of the third diode.

2. The circuit of claim 1, further comprising:
a fifth diode having an anode terminal and a cathode terminal, wherein the anode terminal is coupled to the first IC terminal and the cathode terminal is coupled to the third IC terminal.

3. The circuit of claim 2, further comprising:
a sixth diode having an anode terminal and a cathode terminal, wherein the anode terminal is coupled to the third IC terminal and the cathode terminal is coupled to the first IC terminal.

4. A system comprising:
an integrated circuit (IC);
n number of pins coupled to the IC for measuring temperature, wherein n is an integer greater than or equal to three;
d number of diodes coupled to the n pins, each of the d number of diodes to measure a temperature at a separate location on the integrated circuit, wherein d is an integer equal to n*(n−1), wherein any two of the n pins has two diodes having opposite polarity coupled between them; and
a power source coupled to the IC, wherein the power source supplies a voltage to the IC.

5. The system of claim 4, further comprising:
a temperature sensing circuit coupled to the IC to calculate a temperature of the IC.

6. The system of claim 5, wherein the temperature sensing circuit reduces the voltage supplied to the IC if the calculated IC temperature is greater than a predetermined value.

7. The system of claim 4, wherein the IC is a microprocessor.

8. An apparatus comprising:
an integrated circuit (IC) having at least a first bump, a second bump, and a third bump, wherein a first and second diode are coupled between the first and second bumps to have opposite polarity, and wherein a third and fourth diode are coupled between the second and third bumps to have opposite polarity;
each of the diodes distributed on the IC to measure a temperature at a different location.

9. The apparatus of claim 8, wherein the integrated circuit further comprises a fifth and a sixth diode coupled between the first and third bumps to have opposite polarity, both of the fifth and sixth diodes distributed on the IC to measure temperature at a different location.

10. The apparatus of claim 9 further comprising a temperature sensing circuit to apply current to the first, second, and third bumps and to measure temperatures based on voltage drops.

11. The apparatus of claim 10 wherein a location to measure a temperature is selected by the temperature sensing circuit by applying current to a bump coupled to an anode terminal of one of the six diodes at the selected location.

* * * * *